Sept. 13, 1960 E. F. CARR 2,952,811

MODULATION SYNCHRONIZING PULSE GENERATOR

Filed June 14, 1956

INVENTOR.
EDWARD F. CARR

BY George R. Fust

ATTORNEY

United States Patent Office 2,952,811

Patented Sept. 13, 1960

2,952,811

MODULATION SYNCHRONIZING PULSE GENERATOR

Edward F. Carr, Fort Wayne, Ind., assignor to International Telephone and Telegraph Corporation Filed June 14, 1956, Ser. No. 591,425

2 Claims. (Cl. 328—149)

This invention relates to a modulation synchronizing pulse generator and is particularly directed to a circuit for sampling a signal voltage which has been modulated on a carrier wave and for reliably indicating the period of that signal. Still more particularly, this invention is directed to a circuit for providing a synchronizing signal from an amplitude modulated pulse train.

To display on an oscilloscope a complex signal of an amplitude modulated pulse train or of an amplitude modulated continuous wave carrier, it is necessary to synchronize a sweep voltage generator with the particular component of the signal to be displayed. If the proper time basis is not found, the oscillogram cannot be made to stand still. Where the frequency or period of the wave to be inspected is not known it is often difficult to find and hold the proper sweep frequency.

The object of this invention is to provide an improved circuit for detecting a component of a modulated signal and to provide a distinct pulse in exact synchronism with that signal component.

The objects of this invention are accomplished by a voltage comparator for comparing two voltages, one of which is analogous to the signal to be displayed and the other of which is relatively steady and is proportional to the integrated signal averaged over a relatively long time period. The voltage comparator is coupled to trigger a blocking oscillator which produces a sharp pulse each time the unintegrated signal equals or exceeds the voltage value of the integrated signal. These sharp pulses may be applied for example to the sweep generator of one deflection circuit of an oscilloscope, to the other deflection circuit of which is applied the signal. The graphic outline of the signal on the scope screen is then reliably presented.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
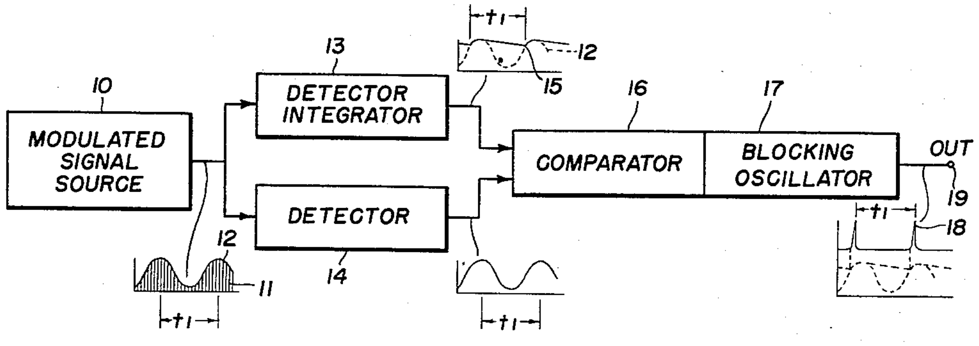
Fig. 1 is a block diagram of the synchronous separator of this invention.

In Fig. 1 let it be assumed that the signal source 10 produces a modulated carrier wave 11 with a modulation envelope 12, and that it is desirable to produce a distinct pulse signal at or near the peaks of the envelope. The time period of the peaks $t_1$ is unknown. The modulated signal 11—12 is applied to two detectors 13 and 14. Detector 13 contains sufficient shunt capacity to produce a substantially steady direct current voltage equal in amplitude to the peak values of the modulation envelope. Even with a high time constant with respect to the modulation period, it will be perceived that the output voltage of detector 13 will decay a finite amount after each peak, as suggested by the wave form at the output of detector 13. The amount of decay and the point at which the direct current component intersects the next succeeding signal wave as at point 15 depends, of course, upon the relative time constant of the detector 13 with respect to time $t_1$, and upon the wave form of the modulation envelope.

The signal of signal source 10 is also applied to detector 14 which according to this invention has substantially no shunt capacity and produces at its output the undistorted signal envelope.

The two detector output voltages are compared in the comparator 16. Comparator 16 is intimately related to the blocking oscillator 17 to produce pulses 18 at the output terminal 19 each time the voltage at the output of detector 14 equals or exceeds the voltage at the output of detector 13. It is found that pulses 18 can reliably be produced at the instant represented by point 15 on the wave form.

Conveniently, pulses 18 can trigger a sweep generator of an oscilloscope, to one deflection circuit of which is applied the modulated signal from source 10.

Figure 2:
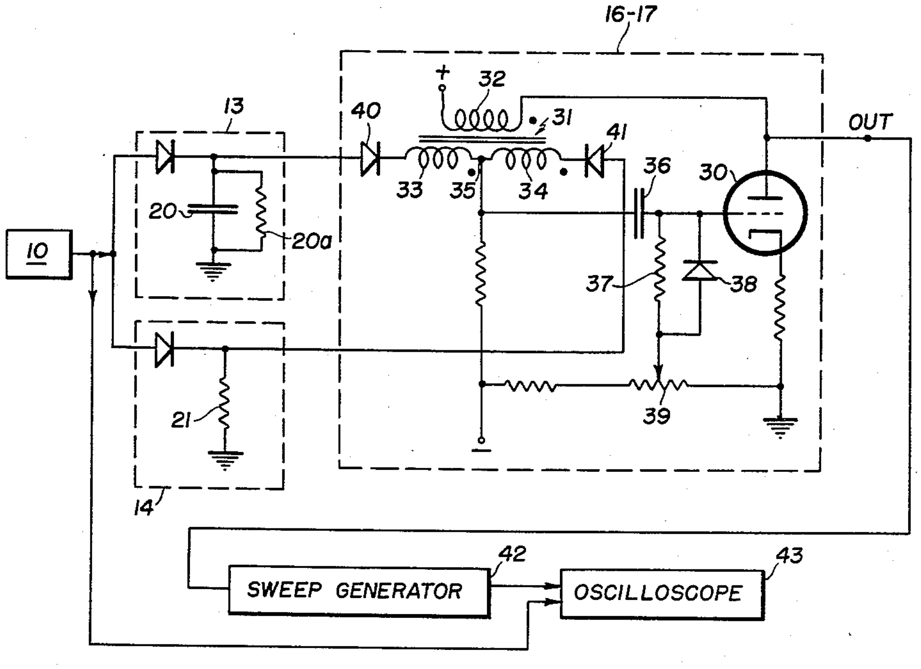
Fig. 2 is a circuit diagram of the system of Fig. 1, particularly applied to an oscilloscope.

In Fig. 2, the two detectors 13 and 14 may comprise rectifiers of the semi-conductor or vacuum diode variety and are similarly polarized with respect to the signal source 10. Across the output of rectifier 13 is shunt capacity 20 which is preferably relatively large to produce a relatively long time constant with respect to the lowest signal frequency to be received. Let it be assumed resistance 20a is the total resistance through and around condenser 20.

Detector 14 on the other hand contains no shunt capacity so that the voltage appearing at the output of the rectifier contains a faithful reproduction of the signal envelope. Leakage resistor 21 is adjusted to properly bias the rectifier. If the carrier need not be eliminated in the comparator, the diode of rectifier 14 may be omitted.

The comparator-blocking oscillator 16, 17 comprises an amplifier 30 with output and input electrodes and with a feedback circuit coupled therebetween, as shown. The transformer 31 comprises a primary winding 32 and two secondary windings 33 and 34. Windings 33 and 34 may, if desired, comprise a single winding with a center-tap 35 so that the polarity of any voltage induced in windings 33 and 34 by the primary winding 32 is of opposite polarity at the two ends of the center tapped winding. It follows that the energy fed from the anode to the grid circuit will be regenerative or degenerative, that is, positive or negative, depending upon which winding 33 or 34 is most conductive. Also in the feedback circuit is the condenser 36 in the grid circuit so that oscillations by oscillator 30 are promptly blocked by the charge accumulated on the grid. The time constant of this charge is regulated by the leak resistor 37 and diode 38 and the mean level of the grid bias is adjusted by the potentiometer 39.

The conductivities of the windings 33 and 34 are respectively controlled by the dynamic resistances of rectifiers 40 and 41. The resistance of rectifiers of the silicon type, for example, is a function of the forward current through the rectifiers. Let it be assumed that the conductivity of rectifier 40 is high, that the current through winding 33 is high, and that the voltage at center-tap 35 will feed only degenerative energy to the control grid of amplifier 30. When, however, the conductance of rectifier 41 is suddenly increased as when the voltage at the output rectifier 14 very slightly exceeds the voltage at the output of rectifier 13, the conductance of 40 is suddenly decreased and the negative feedback can instantaneously be changed to positive feedback. The result is the initiation of oscillations by the oscillator and the production of the output pulse 18.

The operation of the comparator-blocking oscillator is more fully described in the co-pending patent application of Leslie C. Merrill, Serial No. 595,476, filed July 2, 1956, entitled "Voltage Comparators."

The reference voltage in the system of Fig. 2 is established at the output of detector 13 at or near the peak value of the modulated pulse train. This reference voltage is then compared to the pulse train envelope at the output of detector 14 and when the first detected voltage has decayed slightly so that the instantaneous envelope pulse voltage is greater, a sharp voltage pulse results at the output of the blocking oscillator. Whether or not the blocking oscillator fires a second, third, or more times after the first voltage comparison depends upon the wave shape after the first firing and the recovery time of the blocking oscillator as determined by the capacity of condenser 36 and resistance of 37 and 38.

The output of the blocking oscillator may be, for example, applied to the trigger circuit of the sweep generator 42, the output of which may be applied to one deflection circuit of the oscilloscope 43. If to the other deflection circuit is applied the modulated carrier signal from source 10, the wave form 11, 12 will appear on the scope screen.

This system has the feature of being virtually independent of pulse train maximum amplitude since the pulses are effectively compared against themselves. That is, the system works equally well for pulse trains that might vary from 0.1 to 1.0 volt or from 1 to 10 volts. It has been found that this system as shown will synchronize with one pulse of a 30 kilocycle pulse train modulated at 60 cycles per second. By observing the reaction of the blocking oscillator in the input circuit it could be seen that output pulses occur about every fourth or fifth input modulation cycle or every cycle, depending upon the percentage modulation.

The circuit of Fig. 2 may be modified without departing from the invention by substituting a transistor for the amplifier 30. If the power supply to be used is of the polarity indicated in Fig. 2 the transistor would be of the NPN type.

While I have described above the principles of my invention in connection with specific apparatus, it is to be clearly understood that this description is made only by way of example and not as a limitation to the scope of my invention.

What is claimed is:

1. In combination in a modulation synchronous separator for measuring the period of modulation of a modulated carrier; a blocking oscillator with a feedback circuit coupled between the output and input of the oscillator, the feedback circuit including a transformer with two secondary windings magnetically coupled to the primary winding, said two secondary windings being oppositely polarized and having a common terminal capacitively coupled to said oscillator input, two diodes connected, respectively, in series with said two secondary windings; an input terminal for the modulated carrier, and an integrating circuit connected between said terminal and one of said diodes whereby said secondary windings and diodes compare the integrated signal with the modulated signal and supply a signal responsive to the modulated signal exceeding the integrated signal to trigger said oscillator.

2. In combination in a modulation synchronous separator for measuring the period of modulation of a modulated carrier: a blocking oscillator including valve means having control and output elements; a transformer having a primary winding and two secondary windings, said primary winding being connected in series with said valve means output element; said secondary windings being oppositely polarized and having a common terminal capacitively coupled to said valve means control element; two diodes respectively connected in series with said secondary windings; an input terminal adapted to be connected to receive the modulated carrier; and two detectors respectively connected in series between said input terminal and said diodes, one of said detectors having an integrating circuit and thereby providing an integrated signal whereby said secondary windings and said diodes compare the integrated signal with the modulated signal passed by the other detector and supply a signal responsive to said modulated signal exceeding said integrated signal to trigger said oscillator.

References Cited in the file of this patent

UNITED STATES PATENTS

| | | |
|---|---|---|
| 2,438,910 | Grieg | Apr. 6, 1948 |
| 2,540,923 | Williams | Feb. 6, 1951 |
| 2,579,464 | Bergemann | Dec. 25, 1951 |
| 2,609,501 | Guthrie | Sept. 2, 1952 |
| 2,726,329 | Henderson | Dec. 6, 1955 |